United States Patent
Franke et al.

[11] Patent Number: 6,026,840
[45] Date of Patent: Feb. 22, 2000

[54] HYDRAULIC CONTROL SYSTEM

[75] Inventors: Helmut Franke, Harsewinkel; Karl-Thomas Rhody, Boostedt, both of Germany

[73] Assignee: Claas Industrietechnik GmbH, Paderborn, Germany

[21] Appl. No.: 09/112,845

[22] Filed: Jul. 10, 1998

[30] Foreign Application Priority Data

Jul. 11, 1997 [DE] Germany .......................... 197 29 693

[51] Int. Cl.[7] .................................................. G05D 11/03
[52] U.S. Cl. .................. 137/115.06; 137/599; 192/3.58; 192/87.13
[58] Field of Search .............................. 137/115.06, 599; 251/52; 192/3.58, 87.13

[56] References Cited

U.S. PATENT DOCUMENTS

| 3,656,496 | 4/1972 | Uenoyama | 137/115.06 |
| 3,948,147 | 4/1976 | Sauer et al. | 137/115.06 |
| 4,240,457 | 12/1980 | Riediger | 137/115.06 |
| 4,682,531 | 7/1987 | Mayer | 251/52 |

FOREIGN PATENT DOCUMENTS

| 0 743 468 A2 | 4/1996 | European Pat. Off. . |
| 85 30 800 U | 10/1986 | Germany . |
| 41 36 754 A1 | 5/1993 | Germany . |

*Primary Examiner*—Stephen M. Hepperle
*Attorney, Agent, or Firm*—Husch & Eppenberger, LLC; Robert E. Muir

[57] ABSTRACT

A hydraulic control system for connecting elements, which is particularly applicable for an externally engaged clutch on an engine, comprises a pump for producing an oil stream, a distributing valve for determining the flow path of the oil stream, a throttle serving as a metering orifice and inserted in a flow path causing a pressure gradient in the oil stream, a regulating valve connected by supply and return pipes to the flow path of the first throttle upstream and downstream of the throttle, which has a regulating piston acted upon by the higher oil pressure and displaceable against a spring force, a control groove provided on the regulating piston which operates by a ring groove arranged between the piston chamber and the regulating valve with clutch pipe and tank pipes, a second throttle serving as a time orifice and inserted in an output pipe proceeding from the end region of a spring chamber towards the return pipe and adjustable to the closing time of the clutch and a pressure relief output which proceeds from the spring chamber at a distance in front of the output pipe, is connected to the return pipe and can be shut off by the regulating piston on a short stroke.

21 Claims, 2 Drawing Sheets

HYDRAULIC CONTROL SYSTEM

BACKGROUND OF THE INVENTION

The present invention relates generally to engines and, more particularly, to improvements to hydraulic control systems.

The invention aims to provide a hydraulic control system for connecting engaging elements, and in particular for externally engaged clutches of the most varied kind, which in a simple, inexpensive and reliable manner allows acceleration of masses to be driven with a maximum torque in equilibrium with the initial torque. The invention also aims to provide a hydraulic control system for the gentle acceleration of smaller masses in a predetermined time frame.

SUMMARY OF THE INVENTION

In accordance with the present invention there is provided a hydraulic control system having a pump for producing an oil stream, a distributing valve for determining the flow path of the oil stream, a throttle as a metering orifice inserted in a flow path and causing a pressure gradient in the oil stream, a regulating valve which is connected by forward and return pipes to the flow path of the first throttle upstream and downstream of the throttle and has a regulating piston which is acted on by the higher oil pressure and displaceable against a spring force, a control groove which is provided on the regulating piston, a second throttle as a time orifice inserted in an output pipe proceeding from the spring chamber in the end region thereof towards the return and a pressure relief output, which proceeds from the spring chamber at a distance in front of the output pipe thereof and which is connected to a return pipe.

The hydraulic control system embodying the invention provides a simple, inexpensive and reliable means for accelerating masses to be driven with a maximum torque in equilibrium with the initial torque. The preferred embodiment also provides a means for the gentle acceleration of smaller masses in a predetermined time frame.

The control system has a diverse range of applicability. The control can be used in many applications in which speed-dependent or torque-dependent operation of a hydraulic load is required. In the drawings is shown the variant which builds up pressure. The drawings provide a view of the fine control groove in inverse symmetry, illustrating the possibility of pressure-releasing control of the load. The load on a drive train is added with decreasing speed for a machine which normally requires a weak driving force. In the event of overload of the drive, the working speed of the machine would fall and hence require the connection of an additional energy source.

The drawings pertain to a hydraulically controlled clutch, which is the auxiliary output drive of a carrier machine to the power take-off shaft and various connected implements. In the preferred embodiment shown, the auxiliary output drive is connected by an on/off function, which is a solenoid valve in the control device. The implements can have a very large flywheel mass, requiring high acceleration moments which the engine cannot apply. The engine's speed is increased during acceleration. As a result, the closing pressure at the clutch and hence the torque transmitted at the clutch are reduced. A state of equilibrium arises between the initial torque of the engine and the transmitted torque at the clutch which is maintained until the implement has reached its operating speed and no further acceleration moments occur. The starting speed of the power take-off shaft can therefore be applied within the lower speed range of an engine in which the torque is much lower than the nominal torque. Furthermore, the regulating valve prevents stalling of the engine in case of overload. The regulating valve can be provided with several metering orifices, which are switched by means of solenoid valves, to fix differing speed ranges. The use of variable orifices is also possible.

A further embodiment applies to the operation of the clutch in machines. At a low traveling speed, particularly in stop and go traffic, mechanical operation of the clutch would be eliminated. By slightly varying the engine speed, clutch operation would be taken over by the regulating valve.

BRIEF DESCRIPTION OF THE DRAWINGS

In the drawings is shown a practical example of the invention which is described in more detail below.

DETAILED DESCRIPTION

Figure 1:
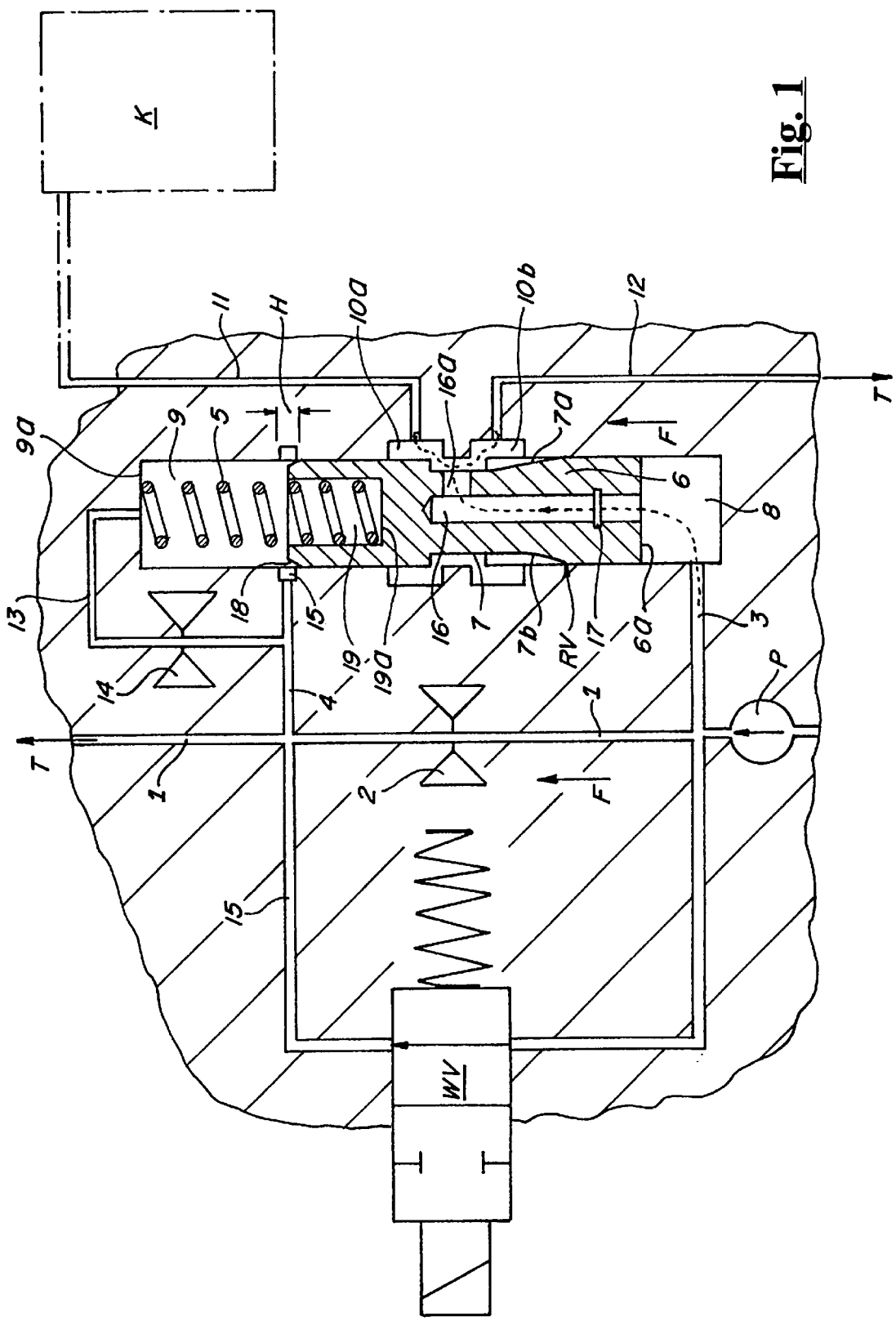
FIG. 1 is a schematic sectional view of a hydraulic clutch control system with a distributing valve turned off and a regulating piston in the starting position.
Figure 2:
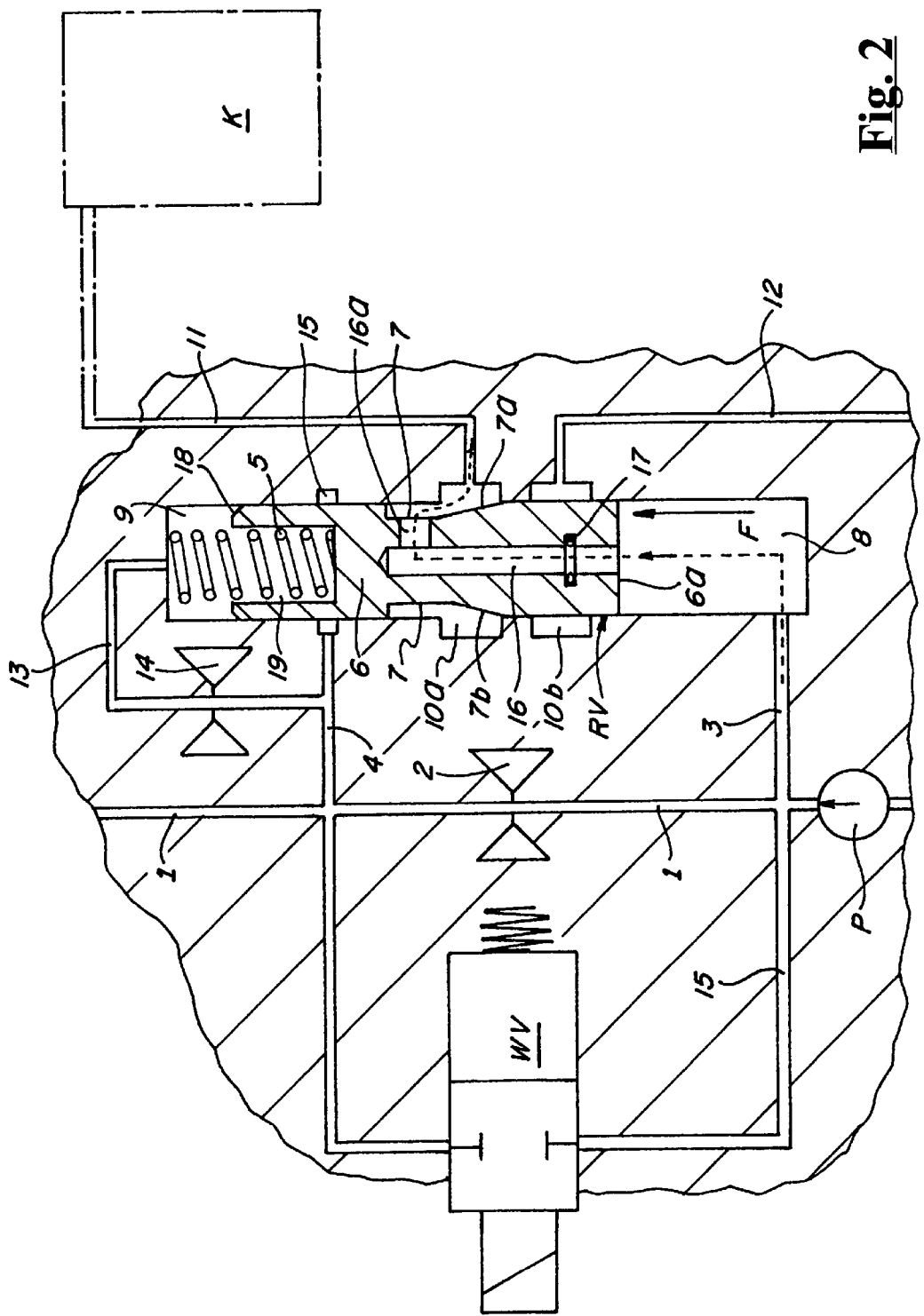
FIG. 2 is a schematic sectional view of the FIG. 1 system with a distributing valve turned on and a regulating piston displaced into the clutch-closing position.

FIGS. 1 and 2 show a hydraulic control system for connecting elements that can be engaged, in particular for an externally engaged clutch K on an engine, comprising a pump P which produces an oil stream and a distributing valve WV which determines the path of flow of the oil stream. A first throttle 2 is inserted as a metering orifice in the flow path or conduit 1, causing a pressure gradient in the oil stream.

A regulating valve RV is connected by inflow pipe 3 and return pipe 4 to the conduit 1 of the first throttle 2, upstream and downstream of first throttle 2. Valve RV has a regulating piston 6 which is acted upon by the higher oil pressure and is displaceable against the force of a spring 5. Furthermore, the regulating piston 6 has a fine control groove 7 which operates in conjunction with a clutch K and tank pipes 11, 12 by a ring grooves 10a, 10b arranged between the piston chamber 8 and the spring chamber 9 of the regulating valve RV.

An output pipe 13 runs from the spring chamber 9 toward the return pipe 4. A second throttle 14 is inserted in the output pipe 13 and serves as a time orifice adjustable to the closing time of the clutch K. A pressure relief output 15 is located a distance in front of the output pipe 13 and is connected to the return pipe 4. The pressure relief output 15 is also formed by an annular groove. The pressure relief output 15 can be shut off by the regulating piston 6 on a short stroke H.

The flow path of the first throttle 2 is dictated by pressure pipe or conduit 1 with intermediate pump P connected to the oil tank T. A bypass pipe 15 with inserted distributing valve VW is connected, upstream and downstream of the throttle 2, to the pressure pipe 1. The inflow pipe 3 is formed by a supply pipe opening into the free end of the piston chamber 8 and the return pipe 4 is formed by a drain pipe extending between the ring grooves 10a, 10b and the free end of the spring chamber 9.

An axial bore 16 with an oil stream limiting device 17 leads from the piston face 6a of the regulating piston 6, which is subject to oil pressure, into the regulating piston 6. An outlet bore extends from the axial bore 16 to the control groove 7, in the direction of flow F downstream of the oil stream limiting device 17. The quantity of oil to the clutch K is regulated by the oil stream limiting device 17, which is formed by a constriction in the bore 16.

The control groove 7 of the regulating piston 6 is defined by an annular groove extending around the outside wall with a linear or progressive control face 7a, 7b for regulating the oil flow in the ring grooves 10a, 10b. In a preferred embodiment, the annular control groove has, over part of its length and extending in the direction of flow F in the end region adjacent to the piston face 6a, an oblique control face 7a, 7b. As shown in the drawing, the oblique control face merges in the direction of flow F with a groove region running rectilinearly and parallel to the longitudinal axis of the piston 6.

The ring grooves 10a, 10b are composed of two annular grooves arranged at a distance one behind the other in the direction of flow F. The pipe or conduit 11 leading to the clutch K is connected to one annular groove 10a. The pipe 12 or conduit leading to the oil tank T is connected to the other annular groove 10b. The annular control groove 7 makes the connection between the two annular grooves 10a, 10b or shuts off one from the other.

The piston 6 comprises at its end on the spring side an oblique or closing edge 18 which operates in conjunction with the pressure relief output 15. The spring force is formed by compression spring 5 guided in a blind hole receptacle 19 of the regulating piston RK. The compression spring 5 is also supported on the bottom 19a of the blind hole 19 and on the end wall 9a of the spring chamber 9. The output pipe 13 extends from this end wall 9a of the spring chamber.

When the distributing valve WV is turned off, the oil stream pumped by the pump P flows through the bypass pipe 15 and past the metering orifice. As a result, no differential pressure arises and, thus, the regulating piston 6 remains in the rest position shown in FIG. 1.

The oil stream flowing through the inflow pipe 3 into the piston chamber 8 and through the piston's 6 bores 16, 18, flows in the same quantity into the ring groove 10a, 10b and back through the pipes 11, 12 to the clutch K and to the tank T as the piston 6 with its control face 7 is in the center position FIG. 1. In this case, the engine has the minimum speed and the clutch K ceases further closing movement. This oil flow is shown by the broken line in FIG. 1.

When the distributing valve WV is turned on, as shown in FIG. 2, the bypass pipe 15 is blocked and the oil stream flows through the pressure pipe 1 and the metering orifice 2. As a result, a pressure gradient arises. The higher pressure upstream of the metering orifice 2 in the direction of flow F and the lower pressure downstream causes the differential pressure to act against the spring force 5.

The regulating piston 6 is acted upon by the oil flowing into the piston chamber 8 through the supply pipe 3 and is displaced into its end position in proportion to the spring characteristic. By this method the pressure on the clutch K is relieved as the control groove 7 is positioned in the regulating piston 6. Furthermore, there is a continuous pressure build-up at the clutch K, which performs power transmission proportionally. The regulating piston 6 is displaced under pressure and its control face 7 shuts off the annular groove 10b from the oil flow to the tank T. The oil then flows through the annular groove 10a and pipe 11 to the clutch K, as shown in broken lines in FIG. 2.

The size of the metering orifice 2 is selected based upon the torque of the engine to be driven, so that the clutch K is operated only when there is the selected minimum torque at the engine. If the transmitted torque at the clutch K exceeds the selected value, the engine loses speed and hence the oil flow is reduced, the pressure gradient at the metering orifice 2 falls and the torque at the clutch K is reduced. A state of equilibrium arises in the torques.

The spring chamber 9 of the regulating piston 6 contains a relatively large quantity of oil which must be displaced during the piston stroke. In order to pass rapidly through the path between full pressure relief of the clutch K to commencement of the action of the control groove 7, the pressure relief groove 15 is provided. The pressure relief groove's 15 length (seen in the direction of flow F) is adapted to the idle stroke of the regulating piston 6. The regulating piston 6 forces oil out of the pressure relief groove 15 closes the pressure relief groove 15 with its closing edge 18. This takes place over a rapid short stroke H.

When this short stroke H has taken place, regulation of the clutch K begins, wherein the oil must be displaced out of the spring chamber 9 via the time orifice 13. The size of the time orifice 13 is adjusted to the desired closing time of the clutch K, with maximum differential pressure at the metering orifice 2, as the clutch K can be engaged even at full engine speed. Without the time orifice 14, the regulating piston 6 would suddenly move into the end position and close the clutch K immediately, which would lead to a sudden acceleration of the device being driven.

Other objects, features and advantages will be apparent to those skilled in the art. While preferred and described, this has been by way of illustration and the invention should not be limited except as required by the scope of the appended claims.

We claim:

1. A hydraulic control system for connecting elements of an engine having a pump for producing an oil stream, a distributing valve for determining the flow path of the oil stream, a throttle as a metering orifice inserted in a flow path and causing a pressure gradient in the oil stream, a regulating valve which is connected by supply and return pipes to the flow path of the first throttle upstream and downstream of the throttle and having a regulating piston which is acted on by the higher oil pressure and displaceable against a spring force, a control groove on the regulating piston, a second throttle as a time orifice inserted in an outlet channel proceeding from the spring chamber in the end region thereof toward the return and a pressure relief output, which proceeds from the spring chamber at a distance in front of the output pipe thereof and which is connected to a return pipe.

2. A hydraulic control system according to claim 1, wherein said control groove operates along with a clutch pipe and a tank pipe, by a groove arranged between the piston chamber and the spring chamber of the regulating valve.

3. A hydraulic control system according to claim 1, including an externally engaged clutch and wherein said second throttle is adjustable to the closing time of the clutch.

4. A hydraulic control system according to claim 1, wherein said pressure relief output can be shut off by the regulating piston by a relatively short stroke of the regulating piston.

5. A hydraulic control system according to claim 1, wherein said flow path of the first throttle is formed by a pressure pipe connected to the oil tank.

6. A hydraulic control system according to claim 5, wherein a bypass pipe with an inserted distribution valve proceeds upstream and downstream of said pressure pipe.

7. A hydraulic control system according to claim 1, wherein said supply pipe is formed by a supply pipe opening into a piston chamber at the free end thereof.

8. A hydraulic control system according to claim 1, wherein said return pipe is formed by a drain pipe extending between the groove and the free end of the spring chamber.

9. A hydraulic control system according to claim 1, wherein an axial bore leads from the piston face of said regulating piston, which is subjected to said oil pressure.

10. A hydraulic control system according to claim 9, including an oil stream limiting device located in said axial bore.

11. A hydraulic control system according to claim 10, including an outlet bore proceeding from said axial bore to the control groove in the direction of flow downstream of the oil stream limiting device.

12. A hydraulic control system according to claim 1, wherein said control groove of the regulating piston is formed by an annular groove extending around the outside wall.

13. A hydraulic control system according to claim 12, wherein said control groove has a linear control face for flow regulation therein.

14. A hydraulic control system according to claim 12, wherein said control groove has a progressive control face for flow regulation therein.

15. A hydraulic control system according to claim 12, wherein said annular control groove has an oblique control face over part of its length extending in the direction of flow and in the end region adjacent to the piston face.

16. A hydraulic control system according to claim 2, wherein said groove is formed by two annular grooves arranged at a distance one behind the other in the direction of flow.

17. A hydraulic control system according to claim 12, including a clutch, and a pipe which is connected from said annular control groove to the clutch.

18. A hydraulic control system according to claim 12, wherein a pipe is connected from said annular groove to the oil tank.

19. A hydraulic control system according to claim 1, wherein said pressure relief output is formed by an annular groove.

20. A hydraulic control system according to claim 1, wherein said piston comprises an oblique closing edge at its end on the spring side edge which operates with the pressure relief output.

21. A hydraulic control system according to claim 1, wherein said spring force is formed by a compression spring guided in a blind hole receptacle of the regulating piston and which is supported on the bottom of the blind hole and on the end wall of the spring chamber having the outlet of the output pipe.

* * * * *